United States Patent [19]
Fujii et al.

[11] Patent Number: 4,599,648
[45] Date of Patent: Jul. 8, 1986

[54] VIDEO SIGNAL TRANSMISSION SYSTEMS

[75] Inventors: Akira Fujii; Tadatsugu Tokunaga; Hiroaki Adachi, all of Tokyo, Japan

[73] Assignee: NEC Corporation, Tokyo, Japan

[21] Appl. No.: 612,835

[22] Filed: May 22, 1984

[30] Foreign Application Priority Data

May 24, 1983 [JP] Japan ................................. 58-90939
May 24, 1983 [JP] Japan ................................. 58-90940

[51] Int. Cl.$^4$ ......................................... H04N 7/167
[52] U.S. Cl. .................................... 358/124; 358/122; 358/120
[58] Field of Search ................ 358/122, 124, 114, 120

[56] References Cited

U.S. PATENT DOCUMENTS

| | | | |
|---|---|---|---|
| 3,440,338 | 4/1969 | Walker | 358/124 |
| 3,801,732 | 4/1974 | Reeves | 358/124 |
| 4,022,972 | 5/1977 | Pires | 358/124 |
| 4,222,068 | 9/1980 | Thompson | 358/124 |
| 4,257,065 | 3/1981 | Papay | 358/124 |
| 4,340,906 | 7/1982 | den Toonder et al. | 358/124 |
| 4,514,761 | 4/1985 | Merrell et al. | 358/122 |

Primary Examiner—S. C. Buczinski
Assistant Examiner—Aaron J. Lewis
Attorney, Agent, or Firm—Sughrue, Mion, Zion, Macpeak & Seas

[57] ABSTRACT

A video signal transmission system wherein a television video signal is subjected to a waveform conversion in a video processing unit on a transmission side, then sent to a receiving side and restored in a restoring processing unit on the receiving side. The video processing unit comprises partly polarity inverts a composite video signal containing a horizontal synchronizing signal in accordance with a pseudo-random code utilizing a horizontal scanning frequency as a clock pulse such that the while level of an inverted video signal portion will not be smaller than a peak level of a non-inverted horizontal synchronizing signal portion. The restoring processing unit on the receiving side inverts again the polarity of the polarity inverted composite video signal portion in accordance with the pseudo-random code to obtain a restored composite video signal portion having the same polarity as the original composite video signal. A difference between the peak level of the horizontal synchronizing signal of the inverted and restored composite video signal portion and the peak level of the horizontal synchronizing signal of the non-inverted composite video signal portion is detected and feedback to the input of the restoring processing unit so as to control these peak levels to the same level.

4 Claims, 8 Drawing Figures

FIG. 2

VIDEO SIGNAL TRANSMISSION SYSTEMS

BACKGROUND OF THE INVENTION

This invention relates to a video signal transmission system, and more particularly a video signal transmission system wherein a television video signal is transmitted by inverting its polarity with a pseudo-random code (PN code) in unit of a horizontal scanning period, and the transmitted signal is restored and reproduced on the receiving side.

In a fee charging television program distribution system utilizing a satellite and a fee charging wired/wireless television broadcasting system, it is necessary to use such a transmission system wherein the television video signal is transmitted after being subjected to a special waveform conversion processing so as not to be readily received by an ordinary receiver set in order that only a contracted receiver can restore the received signal for reproducing a high quality picture. To assure the transmission system of this type, there are available a number of basic processing methods and composite processing methods comprising the basic processing methods in combination.

Among relatively simple basic processing methods, a method may be mentioned wherein the polarity of the white and black levels of a video signal is inverted by taking an intermediate gray level as a reference. According to another method, only the synchronizing signal is inverted and expanded by using a pedestal level as a reference and then transmitted. According to these prior art methods in which the polarity is inverted, the horizontal synchronizing signal usually utilized as the reference level at the time of regenerating a DC component and the video signal are processed independently. As a result, a level difference is caused in the restored video signal owing to variations in the inversion reference level caused by a DC drift of an inversion processing circuit and owing to a difference in the reference levels on the transmission side where the signal is subjected to an inversion processing and on the receiving side where the signal is restored. Therefore, when the inversion processing is performed in unit of scanning line, a stripe shaped tone difference would occur in the picture, thus failing to stably reproduce a high quality picture.

Typically, for restoring the polarity inverted television video signal and regenerating the DC component thereof a feedback compression type clamping circuit has been used. However, the prior art feedback compression type clamping circuit can not be applied as it is to such a signal inclusive of the horizontal synchronizing signal having indefinite polarity for each horizontal scanning line. Even when the inverted polarity is suitable for a restored video signal, it is impossible to eliminate low frequency variation components, failing to provide perfect regeneration of the DC component.

SUMMARY OF THE INVENTION

It is an object of this invention is to provide an improved video signal transmission system capable of maintaining perfect secret with a simple polarity inverting operation and stably obtaining a restored signal of high quality.

Another object of this invention is to provide a clamping circuit for restoring the polarity inverted television video signal and regenerating the DC component thereof which can eliminate the low frequency variation component to regenerate correct video signals.

According to one aspect of this invention, there is provided a video signal transmission system comprising, in combination, a video processing unit on a transmission side adapted to convert the waveform of an original television video signal, for transmission thereof and a restoring processing unit on the receiving side adapted to restore a waveform converted television video signal, for reproduction of the original signal, the video processing unit including:

means responsive to a pseudo-random code utilizing a horizontal scanning frequency as a clock pulse, for partly polarity inverting a composite video signal containing a horizontal synchronizing signal such that the white level of an inverted video signal portion will not fall below a peak level of a non-inverted horizontal sychronizing signal portion; and means for transmitting the partly polarity inverted composite video signal;

the restoring processing unit including:

means responsive to the pseudo-random code, for inverting again the polarity of the polarity inverted composite video signal portion to obtain a restored composite video signal portion having the same polarity as the original composite video signal; and clamp means for detecting a difference between the peak level of the horizontal synchronizing signal of the inverted and restored composite video signal portion and the peak level of the horizontal synchronizing signal of the non-inverted composite video signal portion and feedbacking the detected difference to the input of the clamp means so as to control these peak levels to the same level.

According to another aspect of this invention, there is provided a television signal clamp circuit comprising:

a first differential amplifier amplifying a video input signal whose polarity has been inverted according to a predetermined code pattern in unit of a horizontal synchronizing scanning period, a DC voltage component of said first differential amplifier being controlled by a feedback voltage;

an inverting amplifier and a non-inverting amplifier connected in parallel with the output of the first differential amplifier;

a first switch responsive to a switching control signal for selectively outputting an output signal of either one of the inverting and non-inverting amplifiers;

first and second sample hold circuits respectively holding sychronizing pulse levels of the same polarity outputted from said inverting and non-inverting amplifiers;

a second differential amplifier amplifying a difference between output voltages of the first and second sample hold circuits;

a low-pass filter connected to with the output of the second differential amplifier, for eliminating high frequency components to produce the feedback voltage;

a synchronizing signal separation circuit for separating a synchronizing signal component from the video signal to generate a sampling synchronizing pulse for the sample hold circuits;

a second switch responsive to said switching control signal, for selectively applying an output of the synchronizing signal separation circuit to either one of the first and second sample hold circuits; and a control circuit for generating the switching control signal corresponding to the code pattern utilized to invert the polarity of the input video signal.

BRIEF DESCRIPTION OF THE DRAWINGS

FIG. 2 is a block diagram showing one embodiment of a restoring processing unit installed on the receiving side and embodying the invention;

DESCRIPTION OF THE PREFERRED EMBODIMENTS

Figure 1:
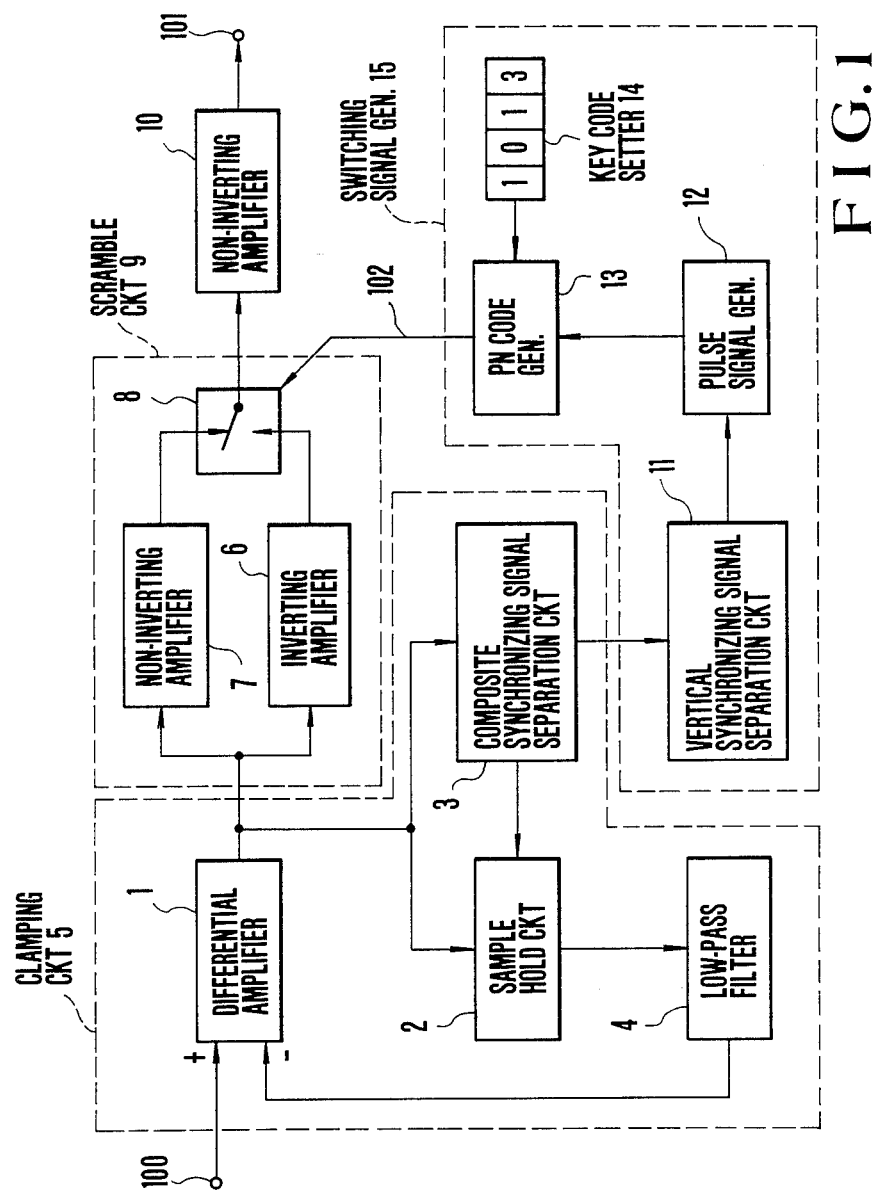
FIG. 1 is a block diagram showing one embodiment of a video processing unit installed on the transmission side and embodying the invention.

Referring now to FIG. 1, there is shown, in block form, a video signal processing unit embodying the invention. This processing unit comprises a well known clamping circuit 5 of the feedback compression type, a scramble circuit 9, a non-inverting amplifier 10, and a switching signal generator 15. The clamping circuit 5 includes a differential amplifier 1, a sample hold circuit 2, a composite synchronizing signal separation circuit 3, and a low-pass filter 4. The scramble circuit 9 is connected to the output of the clamping circuit 5 and includes an inverting amplifier 6, a non-inverting amplifier 7 and a switch 8, for example, an FET switch. The non-inverting amplifier 10 buffers and amplifies the scrambled output and then supplies it to an output terminal 101. The switching signal generator 15 includes a vertical synchronizing signal separation circuit 11, a pulse signal generator 12, a PN code generator 13, and a key code setter 14 and generates a switching signal 102 for controlling the scramble circuit 9.

The feedback compression type clamp circuit 5 corresponds to the same type circuit conventionally used on the receiving side, as described previously, for restoring the polarity inverted television signal and regenerating the DC component thereof.

The output of the differential amplifier 1 is applied to the synchronizing signal separation circuit 3 (slice type) and a sample hold circuit 2. The composite synchronizing signal separation circuit 3 generates a sampling synchronizing pulse. The peak envelope of the synchronizing pulse is fed back to the differential amplifier 1 via the low-pass filter 4, thereby clamping the peak level of the synchronizing pulse to a predetermined value.

Figure 3A:
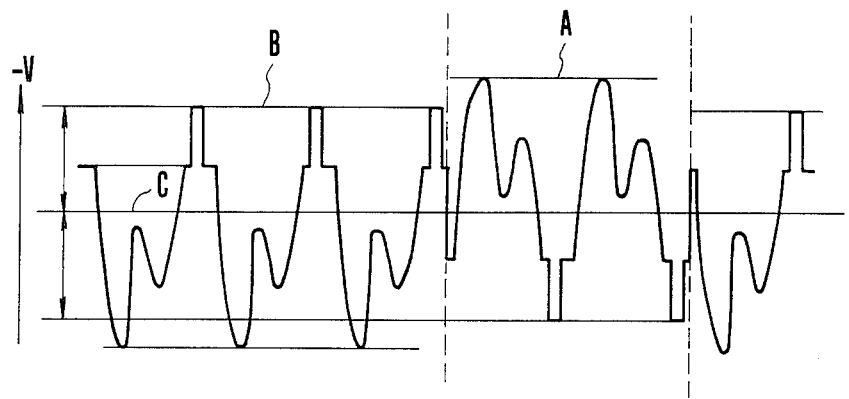
FIGS. 3A and 3B show an inverted signal waveform and a restored waveform, respectively.

In FIG. 1, a composite video signal inputted to an input terminal 100 is set with a DC level by the clamping circuit 5 and then sent to the scramble circuit 9 which switches the outputs of the inverting amplifier 6 and the non-inverting amplifier 7 in accordance with the switching signal 102 synchronous with the horizontal synchronizing signal so as to send out a scramble signal whose polarity has been inverted at the back porch portion of the horizontal synchronizing signal as shown in FIG. 3A. The DC voltage of the inverting amplifier 6 and the non-inverting amplifier 7 is set such that the white level A of an inverted video signal will slightly exceed the peak level B of the non-inverting horizontal synchronizing signal. In a slice type synchronous detector of an ordinary receiver set, since the horizontal synchronism is disturbed by the inverted portion of the video signal, a sufficient secret holding effect can be obtained which is assisted by the inverting effect of the video signal. Accordingly, it becomes difficult to identify the image of an original before subjected to scramble processing.

The vertical synchronizing signal separation circuit 13 of the switching signal generator 15 separates the vertical synchronizing signal from the output of the composite synchronizing signal separation circuit 3 so as to count the number of equalizing pulses and the number of the horizontal synchronizing signals which follow the vertical synchronizing signal, thus sending a start pulse synchronous with the first horizontal synchronizing signal to the pulse signal generator 12. The pulse signal generator 12 includes an oscillator having a stable frequency, and generates a pulse signal having a frequency of the horizontal synchronizing signal and being delayed a predetermined time with respect to the start pulse. This signal is used as a clock input to the PN code generator 13, and a PN code designated by a decimal four-digit key code setter 14 is sent to the scramble circuit 9 to act as the switching signal 102, whereby the polarity is inverted at the back porch portion of the horizontal synchronizing signal as shown in FIG. 3A. The pulse signal generator 12 is provided with a counter which when counting a predetermined number of the generated pulses, stops generation of the pulse signal so as to restart the delivery of the start pulse from the vertical synchronizing signal separation circuit 11. Thus, the inverting operation period by the scramble circuit 9 is limited only to the video signal period so that the vertical synchronizing signal containing the equalizing pulses is transmitted as it is. Even when the frequency of the pulse signal generated by the pulse signal generator 12 does not perfectly coincide with the frequency of the horizontal synchronizing signal, the phase shift occurring during one field is so small that it does not affect the inverting operation of the scramble circuit 9 since each vertical synchronizing signal maintains the synchronism.

Figure 2:
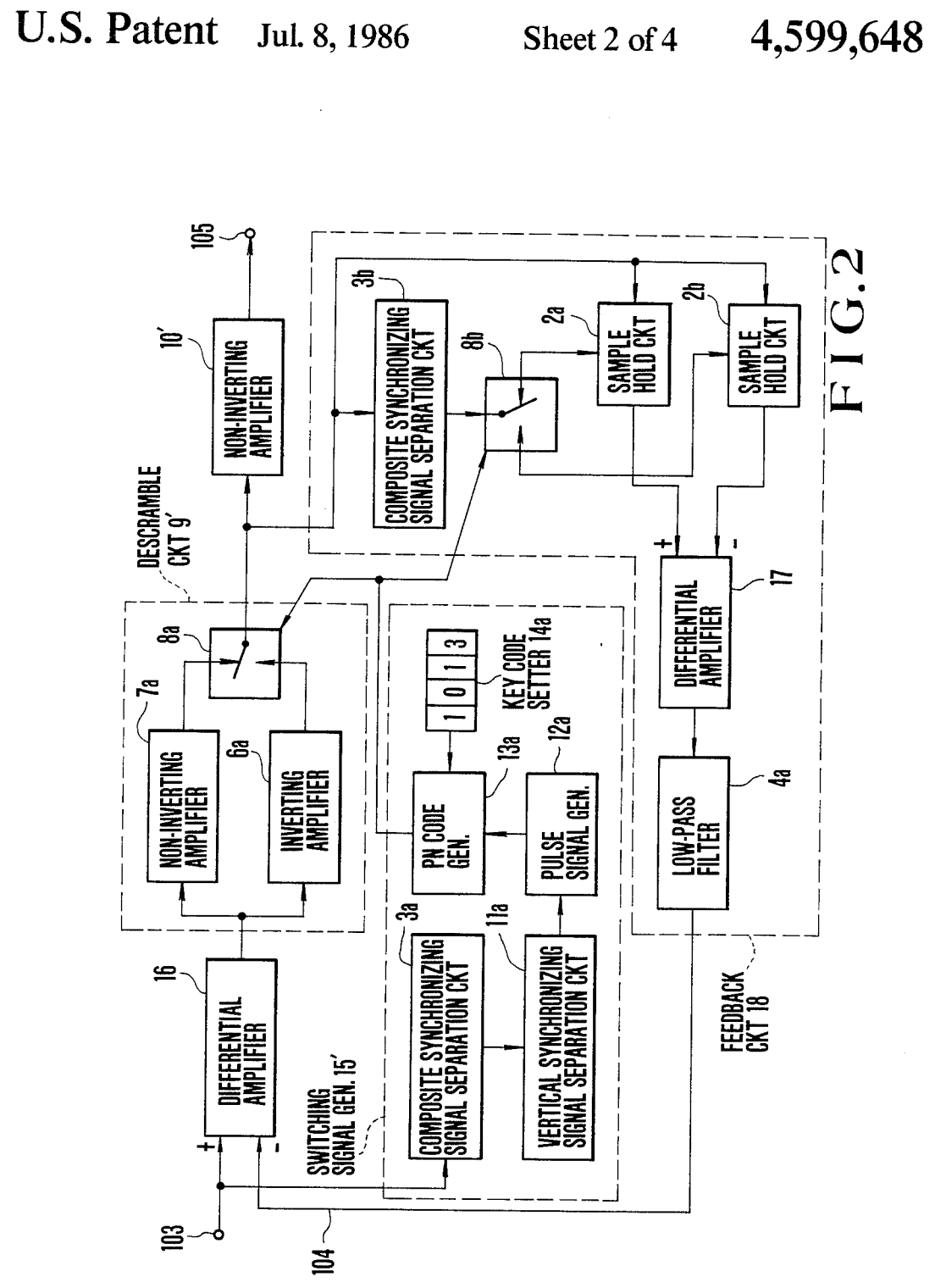

The restoring processing unit shown in FIG. 2 is constituted by a differential amplifier 16, a descramble circuit 9′, a non-inverting amplifier 10′, a switching signal generator 15′, and a feedback circuit 18. The differential amplifier 16 amplifies the scramble signal inputted to an input terminal 103 and subjected to the inverting processing and has the DC component controlled by a feedback voltage 104. The descramble circuit 9′ restores the scramble signal received from the differential amplifier to a signal of the same polarity. The non-inverting amplifier 10′ buffers and amplifies the output of the descramble circuit 9′ for supplying a regenerated signal to an output terminal 105. The switching signal generator 15′ generates the same PN code as that of the transmission side by using the vertical synchronizing signal of the received signal as a reference. The feedback circuit 18 adapted to generate the feedback voltage 104 includes a composite synchronizing signal separation circuit 3b, sample hold circuits 2a and 2b, a switch 8b, for example, an FET switch, a differential amplifier 17, and a low-pass filter 4a.

Figure 3B:
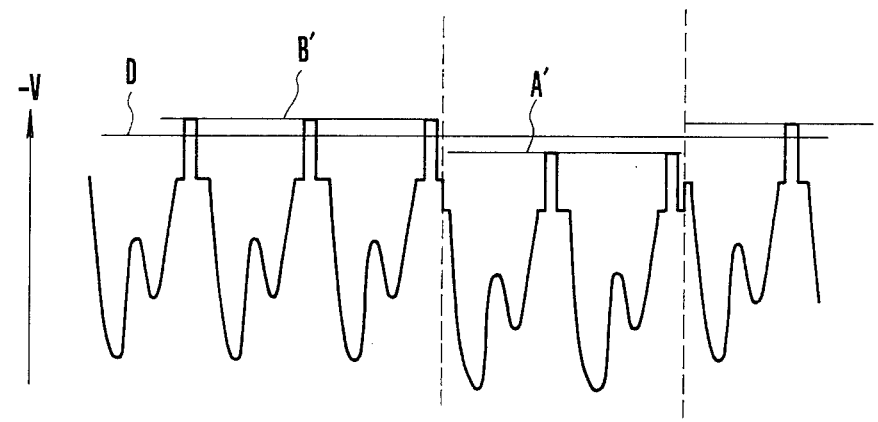

The scramble signal as shown in FIG. 3A and inputted to the input terminal 103 is applied to the descramble circuit 9′ through the differential amplifier 16 to be restored to a signal having the non-inverting polarity as shown in FIG. 3B, the descramble circuit 9′ comprising an inverting amplifier 6a, a non-inverting amplifier 7a and a switch 8a, for example, an FET switch, like the scramble circuit 9. Where the inversion reference level of the descramble circuit 9' does not coincide with an intermediate level as shown at C in FIG. 3A of the peak level of the inverted and non-inverted horizontal synchronizing signals, the peak level of the horizontal synchronizing signal of the restored signal does not coincide as shown at B' and A' in FIG. 3B. To make the peak levels coincident, the voltage levels A' and B' are detected and the DC component of the input signal is controlled in accordance with the difference between the levels A' and B' for decreasing the DC component in the case of FIG. 3B. Then the level B' decreases and the level A' increases whereby A' and B' will come to coincide with each other at a level D. Conversely, where the level B' is lower than the A', the control is so made as to increase the DC component of the input signal.

In the circuit shown in FIG. 2, the output of the composite synchronizing signal separation circuit 3b is switched over by the switch 8b in synchronism with the inverting operation of the descramble circuit 9' so as to obtain a sampling synchronizing pulse for the two sample hold circuits 2a and 2b. Then, the peak envelope level A' of the inverted and restored horizontal synchronizing signal and the peak envelope level B' of the non-inverted horizontal synchronizing signal are detected and a difference therebetween is obtained by the differential amplifier 17, the difference being fed back to the differential amplifier 16 via the low-pass filter 4a. Like the switching signal generator 15 on the transmission side, the switching signal generator 15' is constituted by a composite synchronizing signal separation circuit 3a, a vertical synchronizing signal separation circuit 11a, a pulse signal generator 12a, a PN code generator 13a and a key code setter 14a, and generates the same PN code as that on the transmission side for simultaneous control of the switches 8a and 8b.

As described above, the feedback circuit controls the peak level of the horizontal synchronizing signal of the restored signal so that individual peak levels always coincide with each other. Consequently, the relation between the video signal and the horizontal synchronizing signal will not be varied by the inverting operation, whereby a correct composite video signal is reproduced, thus providing pictures of high quality.

In the foregoing embodiment, the white level of a video signal inverted by the video processing unit on the transmission side exceeds the peak level of a non-inverted horizontal synchronizing signal. But, even when both levels are equal or when the white level is slightly lower, secret can be well maintained by the inverting effect of the video signal although the effect of disturbing the horizontal synchronism is degraded slightly when the signal is received by the ordinary receiver set. The secret keeping performance can be further enhanced by combining the above operation with an additional tramsmission of an inverting vertical synchronizing signal. It should be understood that circuits shown in FIGS. 1 and 2 are mere illustration of this invention and that the invention is not limited to these circuits. For example, the pulse generator of the switching code generator circuit described as containing an independent oscillator having a stable frequency so as to generate a horizontal synchronizing signal frequency may be replaced by an arrangement which produces the horizontal synchronizing signal frequency by multiplying the frequency of the vertical synchronizing signal. Although, in the foregoing embodiment, the circuit has been constructed such that the PN code generated by the PN code generator is set from outside with the key code setter, the PN code may automatically be set by coding a key code on the transmission side, transmitting the coded key code during the vertical blanking period or the like and then decoding the code on the receiving side. Where the sample hold circuits 2a and 2b shown in FIG. 2 are used to sample and hold the level of the pedestal portion instead of the peak level of the horizontal synchronizing signal, a control that matches the pedestal levels can be made. In this case, even when the gains of the inverting amplifier and the non-inverting amplifier are not equal, the degradation of the picture can advantageously be suppressed.

It should be understood from the following description that the FIG. 2 circuit arrangement acts as an improved clamping circuit according to this invention substituting for the known feedback compression type clamping circuit 5 of FIG. 1.

Figures 4A, 4B, 4C, 4D:
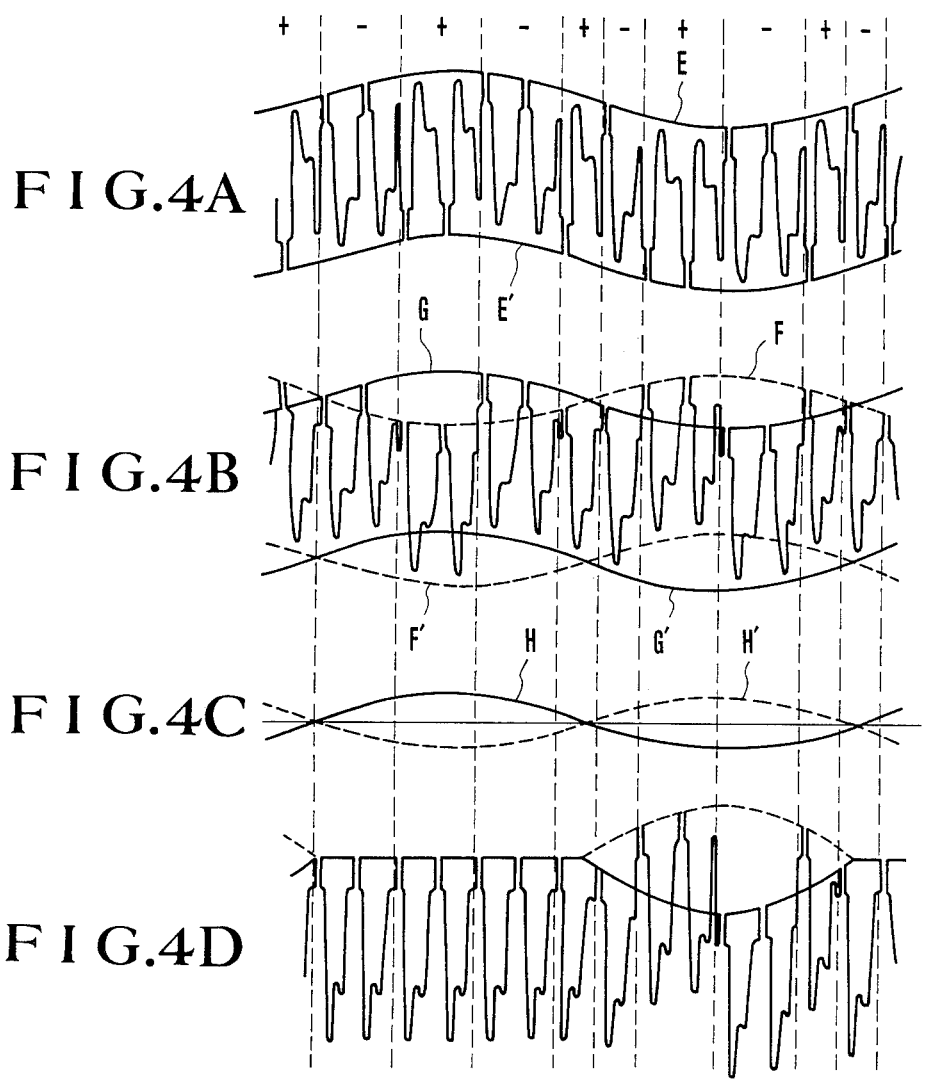
FIGS. 4A to 4D are waveform diagrams useful in explaining elimination of the low frequency variation component in a clamping circuit according to this invention.

Referring to FIGS. 4A to 4D, it is now assumed that the input video signal contains low frequency varying components. Then, the input to the differential amplifier 16 varies as shown in FIG. 4A and its synchronizing pulse envelope is shown by solid curves E and E'. Assuming that the feedback voltage 104 to the differential amplifier 16 is constant, the outputs of the inverting amplifier 6a and the non-inverting amplifier 7a have synchronous pulse envelopes as shown at broken curves F, F' and solid curves G, G' in FIG. 4B, and the output waveform of the switch 8a obtained by inverting, that is, by restoring the positive portions of FIG. 4A will become as shown in FIG. 4B.

When the low frequency varying component is controlled by a feedback circuit similar to the clamping circuit 5 of FIG. 1 including only one sample hold circuit, the synchronizing pulse envelope detected will become as shown at solid curve H and dotted curve H'. The solid curve portion H is in phase with the low-frequency varying component contained in the input signal, that is, E and E' in FIG. 4a, but the dotted curve portion H' will be of opposite phase to E and E'. When these signals are applied to the differential amplifier 16, the output of the switch 8a has a waveform as shown in FIG. 4D in which varying components are removed from the in-phase portion whereas emphasized in the opposite phase portions, thus giving rise to an unstable operation wherein stripe shaped tones are formed in the picture level.

To eliminate this defect, the sign of the opposite phase portions should be reversed. With the circuit of FIG. 2, the sampling synchronizing pulse is switched to either sample hold circuit 2a or 2b by the switch 8b in synchronism with the switch 8a to generate envelopes as shown at E and G in FIG. 4B. Then the difference between these envelopes is determined by the differential amplifier 17 so as to obtain a polarity inverted feedback voltage. Consequently, it is possible to provide a stable negative feedback and to clamp the peak levels of all synchronizing pulses to the same level, thereby correctly restoring the video signal.

As described above, according to this invention, secret can be sufficiently preserved by a simple operation wherein, on the transmission side, a composites video signal containing a horizontal synchronizing signal is inverted and transmitted and when the video signal is restored on the receiving side, a video signal of high quality can be restored without being affected by DC drift and low frequency varying components. Therefore, according to this invention, the inverting reference levels on the transmission and receiving sides are not required to be strictly coincident with each other.

What is claimed is:

1. A video signal transmission system comprising, in combination, a video processing unit on a transmission side adapted to convert the waveform of an original television video signal, for transmission thereof and a restoring processing unit on the receiving side adapted to restore a waveform converted television video signal, for reproduction of the original signal, said video processing unit including:

means responsive to a pseudo-random code utilizing a horizontal scanning frequency as a clock pulse, for partly polarity inverting a composite video signal containing a horizontal synchronizing signal such that the white level of an inverted video signal portion will not fall below a peak level of a non-inverted horizontal sychronizing signal portion; and means for transmitting said partly polarity inverted composite video signal;

said restoring processing unit including:

means responsive to said pseudo-random code, for inverting again the polarity of said polarity inverted composite video signal portion to obtain a restored composite video signal portion having the same polarity as the original composite video signal; and clamp means for detecting a difference between the peak level of the horizontal synchronizing signal of said inverted and restored composite video signal portion and the peak level of the horizontal synchronizing signal of said non-inverted composite video signal portion and feedbacking the detected difference to the input of said clamp means so as to control these peak levels to the same level.

2. A video signal transmission system comprising, in combination, a video processing unit on a transmission side adapted to convert the waveform of an original television video signal, for transmission thereof and a restoring processing unit on the receiving side adapted to restore a waveform converted television video signal, for reproduction of the original signal, said video processing unit including:

means responsive to a pseudo-random code utilizing a horizontal scanning frequency as a clock pulse, for partly polarity inverting a composite video signal containing a horizontal synchronizing signal such that the white level of an inverted video signal portion will not fall below a peak level of a non-inverted horizontal synchronizing signal portion; and means for transmitting said partly polarity inverted composite video signal;

said restoring processing unit including:

means responsive to said pseudo-random code, for inverting again the polarity of said polarity inverted composite video signal portion to obtain a restored composite video signal portion having the same polarity as the original composite video signal; and clamp means for detecting a difference between the pedestal level of said inverted and restored composite video signal portion and the pedestal level of said non-inverted composite video signal portion and feedbacking the detected difference to the input of said clamp means so as to control these pedestal levels to the same level.

3. A television signal clamp circuit comprising:

a first differential amplifier amplifying a video input signal whose polarity has been inverted according to a predetermined code pattern in unit of a horizontal synchronizing scanning period, a DC voltage component of said first differential amplifier being controlled by a feedback voltage;

an inverting amplifier and a non-inverting amplifier connected in parallel with the output of said first differential amplifier;

a first switch responsive to a switching control signal for selectively outputting an output signal of either one of said inverting and non-inverting amplifiers;

first and second sample hold circuits respectively holding sychronizing pulse levels of the same polarity outputted from said inverting and non-inverting amplifiers;

a second differential amplifier amplifying a difference between output voltages of said first and second sample hold circuits;

a low-pass filter connected to with the output of said second differential amplifier, for eliminating high frequency components to produce said feedback voltage;

a synchronizing signal separation circuit for separating a synchronizing signal component from said video signal to generate a sampling synchronizing pulse for said sample hold circuits;

a second switch responsive to said switching control signal, for selectively applying an output of said synchronizing signal separation circuit to either one of said first and second sample hold circuits; and a control circuit for generating said switching control signal corresponding to said code pattern utilized to invert the polarity of said input video signal.

4. A television signal clamp circuit comprising:

a first differential amplifier amplifying a video input signal whose polarity has been inverted according to a predetermined code pattern in unit of a horizontal synchronizing scanning period, a DC voltage component of said first differential amplifier being controlled by a feedback voltage;

an inverting amplifier and a non-inverting amplifier connected in parallel with the output of said first differential amplifier;

a first switch responsive to a switching control signal for selectively outputting an output signal of either one of said inverting and non-inverting amplifiers;

first and second sample hold circuits respectively holding pedestal levels of the same polarity outputted from said inverting and non-inverting amplifiers;

a second differential amplifier amplifying a difference between output voltages of said first and second sample hold circuits;

a low-pass filter connected to the output of said second differential amplifier, for eliminating high frequency components to produce said feedback voltage;

a sychronizing signal separation circuit for separating a synchronizing signal component from said video signal to generate a sampling synchronizing pulse for said sample hold circuits;

a second switch responsive to said switching control signal, for selectively applying an output of said synchronizing signal separation circuit to either one of said first and second sample hold circuits; and a control circuit for generating said switching control signal corresponding to said code pattern utilized to invert the polarity of said input video signal.

* * * * *